US012292931B2

(12) United States Patent
Sasikumar

(10) Patent No.: US 12,292,931 B2
(45) Date of Patent: May 6, 2025

(54) SYSTEMS AND METHODS FOR MULTI-VENDOR STORAGE INFRASTRUCTURE IN A DASHBOARD

(71) Applicant: Fidelity Information Services, LLC, Jacksonville, FL (US)

(72) Inventor: Aravind Sasikumar, Bengaluru (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 198 days.

(21) Appl. No.: 17/387,012

(22) Filed: Jul. 28, 2021

(65) Prior Publication Data
US 2022/0398282 A1    Dec. 15, 2022

(30) Foreign Application Priority Data

Jun. 10, 2021  (IN) .............................. 202111025838

(51) Int. Cl.
*G06F 16/903* (2019.01)
(52) U.S. Cl.
CPC .............................. *G06F 16/90335* (2019.01)
(58) Field of Classification Search
None
See application file for complete search history.

(56) References Cited

U.S. PATENT DOCUMENTS

| | | | |
|---|---|---|---|
| 7,506,040 B1 | 3/2009 | Rabe et al. | |
| 2002/0055888 A1* | 5/2002 | Beran | G06Q 30/06 705/26.1 |
| 2005/0193010 A1* | 9/2005 | DeShan | G06Q 30/02 |
| 2006/0155928 A1 | 7/2006 | Mimatsu | |
| 2009/0228339 A1* | 9/2009 | Wolf | G06Q 30/08 705/26.1 |
| 2011/0283214 A1 | 11/2011 | Kothandapani et al. | |
| 2014/0095594 A1* | 4/2014 | Tsuchiya | G06Q 30/0601 709/203 |
| 2014/0108937 A1 | 4/2014 | Data et al. | |
| 2014/0181085 A1 | 6/2014 | Gokhale et al. | |
| 2016/0188718 A1* | 6/2016 | Inoue | G06F 16/3331 707/706 |
| 2016/0292200 A1* | 10/2016 | Gabay | G06Q 10/087 |

(Continued)

*Primary Examiner* — Augustine K. Obisesan
(74) *Attorney, Agent, or Firm* — Bookoff McAndrews, PLLC

(57) ABSTRACT

A method for monitoring and managing heterogeneous vendor storage systems may include performing, by a management system, operations including: sending instructions to a vendor storage system among the heterogeneous vendor storage systems to cause the vendor storage system to generate a vendor answer file on the vendor storage system, sending instructions to the vendor storage system to copy vendor data from the generated vendor answer file to volatile memory of the management system, tracking and logging events associated with the copying of the vendor data, validating the copied vendor data based on the logged events, determining standardized reporting data from the validated vendor data in the volatile memory of the management system, saving the standardized reporting data in a data structure formatted for the heterogeneous vendor storage systems, receiving a user query regarding the saved standardized reporting data, and displaying the saved standardized reporting data in a user interface.

18 Claims, 13 Drawing Sheets

(56) References Cited

U.S. PATENT DOCUMENTS

| | | | |
|---|---|---|---|
| 2017/0013047 A1* | 1/2017 | Hubbard | H04L 67/535 |
| 2018/0089017 A1* | 3/2018 | Cook | G06F 11/0709 |
| 2018/0275907 A1* | 9/2018 | Subramanian | G06F 16/148 |
| 2021/0149964 A1* | 5/2021 | Wang | G06F 16/3329 |

* cited by examiner

↓FROM FIG. 9

[AGGR LIST ▾]

☒ NETAPP AGGREGATES USAGE

SHOW [15 ▾] ENTRIES                                                                                          SEARCH: [       ]

| DC CLUSTER | IP | NODE | TIER | AGGR | TOTAL_TB | USED_TB | AVAIL_TB | ALLOC_TB | USED_PCT | ALLOCATED_PCT | DISKS | VOLS |
|---|---|---|---|---|---|---|---|---|---|---|---|---|
| BD::BDNETAPP30-CLSTR | 10.236.30.36 | BDNETAPP30A | 3 | BDNETAPP30A_4000SATA_AGGR01 | 58.83 | 44.10 | 14.04 | 122.18 | 75 | 208 | 20 | 32 |
| BD BDNETAPP30-CLSTR | 10.236.30.36 | BDNETAPP30A | 2 | BDNETAPP30A_900SAS_AGGR01 | 154.47 | 71.77 | 82.70 | 404.20 | 45 | 262 | 230 | 138 |
| BD::BDNETAPP30-CLSTR | 10.236.30.36 | BDNETAPP30A | 3 | BDNETAPP30A_ROOT_AGGR | 2.21 | 0.40 | 1.72 | 0.40 | 22 | 22 | 5 | 1 |
| BD::BDNETAPP30-CLSTR | 10.236.30.36 | BDNETAPP30B | 3 | BDNETAPP30B_4000SATA_AGGR01 | 235.31 | 154.75 | 80.56 | 445.48 | 66 | 189 | 80 | 100 |
| BD::BDNETAPP30-CLSTR | 10.236.30.36 | BDNETAPP30B | 2 | BDNETAPP30B_4000SATA_AGGR01 | 154.47 | 77.24 | 77.23 | 229.30 | 50 | 148 | 230 | 81 |
| BD BDNETAPP30-CLSTR | 10.236.30.36 | BDNETAPP30B | 3 | BDNETAPP30B_ROOT_AGGR | 0.74 | 0.40 | 0.24 | 0.40 | 67 | 66 | 3 | 1 |
| BD::BDNETAPP30-CLSTR | 10.236.30.36 | BDNETAPP30C | 1 | BDNETAPP30C_FP_1800SAS_AGGR01 | 159.57 | 33.47 | 126.10 | 91.53 | 21 | 57 | 133 | 81 |
| BD::BDNETAPP30-CLSTR | 10.236.30.36 | BDNETAPP30C | 3 | BDNETAPP30C_ROOT_AGGR | 0.74 | 0.40 | 0.24 | 0.40 | 67 | 66 | 3 | 1 |
| BD::BDNETAPP30-CLSTR | 10.236.30.36 | BDNETAPP30D | 3 | BDNETAPP30D_4000SATA_AGGR01 | 117.66 | 0.02 | 117.64 | 3.5 | 0 | 3 | 40 | 1 |
| BD::BDNETAPP30-CLSTR | 10.236.30.36 | BDNETAPP30D | 2 | BDNETAPP30D_900SAS_AGGR01 | 189.91 | 52.44 | 117.47 | 263.30 | 31 | 155 | 253 | 43 |
| BD::BDNETAPP30-CLSTR | 10.236.30.36 | BDNETAPP30D | 3 | BDNETAPP30D_ROOT_AGGR | 0.74 | 0.49 | 0.24 | 0.49 | 67 | 66 | 3 | 1 |
| BD::BDNETAPP30-CLSTR | 10.236.30.36 | BDNETAPP30E | 1 | BDNETAPP30E_FP_1800SAS_AGGR01 | 154.42 | 63.40 | 91.03 | 311.38 | 41 | 202 | 128 | 48 |
| BD::BDNETAPP30-CLSTR | 10.236.30.36 | BDNETAPP30E | 3 | BDNETAPP30E_ROOT_AGGR | 1.40 | 1.33 | 0.07 | 1.32 | 95 | 94 | 3 | 1 |
| BD::BDNETAPP30-CLSTR | 10.236.30.36 | BDNETAPP30F | 1 | BDNETAPP30F_FP_1800SAS_AGGR01 | 154.42 | 103.84 | 50.58 | 311.38 | 67 | 202 | 128 | 50 |
| BD::BDNETAPP30-CLSTR | 10.236.30.36 | BDNETAPP30F | 3 | BDNETAPP30F_ROOT_AGGR | 1.40 | 1.33 | 0.07 | 1.32 | 95 | 94 | 3 | 1 |
| DC CLUSTER | IP | NODE | TIER | AGGR | TOTAL_TB | USED_TB | AVAIL_TB | ALLOC_TB | USED_PCT | ALLOCATED_PCT | DISKS | VOLS |

SHOWING 1 TO 15 OF 86 ENTRIES        FIRST  PREVIOUS  [1]  2  3  4  5  6  7  NEXT  LAST

| | | | | | SEARCH: | |
|---|---|---|---|---|---|---|
| SNAPNAME | ▲CREATED | ◆VSERVER | ◆VOLUME | ◆DEPENDENCY | ◆CUMULATIVE GB | ◆TOTAL GB | ◆AGGREGATE |
| 1500_2020-08-15_1800 | 8/15/2020 4:00:12 PM | PDC1LNPC1B1C01 | PDC2NBADWEAP28_RIP | | 0 | 0 | PDONETAPP30I_FP_1800SAS_AGGR02 |
| 1500_2020-08-15_1800 | 8/15/2020 4:00:22 PM | PDC1LNPC1B1C01 | PDC2NBADWEAP27_DWN | | 0 | 0 | PDONETAPP30I_FP_1800SAS_AGGR02 |
| 1500_2020-08-15_1800 | 8/15/2020 4:00:02 PM | PDC1LNPC1B1C01 | PDC2NBADWEAP27_DOC | | 0 | 0 | PDONETAPP30I_FP_1800SAS_AGGR02 |
| 1500_2020-08-15_1800 | 8/15/2020 4:00:12 PM | PDC1LNPC1B1C01 | PDC2NBADWEAP26_MDW | | 0 | 0 | PDONETAPP30I_FP_1800SAS_AGGR02 |
| 1500_2020-08-15_1800 | 8/15/2020 4:00:08 PM | PDC1LNPC1B1C01 | PDC2NBADWEAP26_DOC | | 0 | 0 | PDONETAPP30I_FP_1800SAS_AGGR02 |
| 1500_2020-08-15_1800 | 8/15/2020 4:00:21 PM | PDC1LNPC1B1C01 | PDC2NBADWEAP26_RIP | | 0 | 0 | PDONETAPP30I_FP_1800SAS_AGGR02 |
| 1500_2020-08-15_1800 | 8/15/2020 4:00:08 PM | PDC1LNPC1B1C01 | PDC2NBADWEAP26_DWN | | 0 | 0 | PDONETAPP30I_FP_1800SAS_AGGR02 |
| 1500_2020-08-15_1800 | 8/15/2020 4:00:12 PM | PDC1LNPC1B1C01 | PDC2NBADWEAP28_RIP | | 0 | 0 | PDONETAPP30I_FP_1800SAS_AGGR02 |
| 1500_2020-08-15_1800 | 8/15/2020 4:00:12 PM | PDC1LNPC1B1C01 | PDC2NBADWEAP28_MDW | | 0 | 0 | PDONETAPP30I_FP_1800SAS_AGGR02 |

REFRESH DETAILS ◯ STORM
⌂CAPACITY ⊞HEALTH ⌾GRAFANA STATS ≡VOLUME LIST ⌨SERVERS
LIST OF SNAPS WHICH ARE OLDER THAN 45 DAYS ☐SNAPIO▸

HIGHLIGHTS: TOTAL SPACE TO RECLAIM = 527.07 TB

SNAPS

NUMBER OF SNAPS BETWEEN THEN 45-60DAYS = 2351, ABOVE 60DAYS = 2203 ~1010
STORAGE CONSUMEND (TB) TIER 0 = 5.15, TIER 1 = 3.37, TIER 3 = 518.83 ~1011
COST AVOIDANCE TOTAL = 332.81k $ : TIER 0 = 15450, TIER 1 = 6066, TIER 3 = 311298 ~1012

SHOW [15 ▾] ENTRIES

FIG. 10

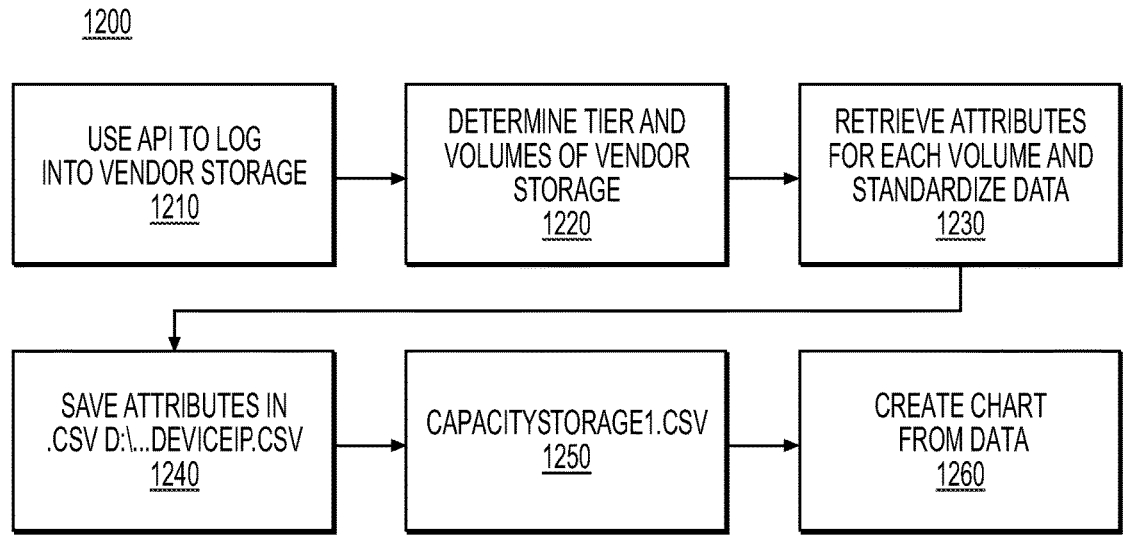

FIG. 12

| STANDARDIZED DATA | VENDOR-SPECIFIC IDENTIFIER |
|---|---|
| ALLOCATED TO POOL SPACE | ALLOCATEDSPACE.BLOCKSIZE |
| USED SPACE ON POOL | USEDSPACE.BLOCKSIZE |
| FREE SPACE ON POOL | FREESPACE.BLOCKSIZE |
| NON ALLOCATED SPACE | NONALLOCATEDSPACE.BLOCKSIZE |
| TOTAL SPACE (TB) | ALLOCATEDSPACE.BLOCKSIZE + NONALLOCATEDSPACE.BLOCKSIZE |
| FREE SPACE (TB) | NONALLOCATEDSPACE.BLOCKSIZE + FREESPACE.BLOCKSIZE |
| USED SPACE (TB) | USEDSPACE.BLOCKSIZE |
| PERCENTAGE FREE | ((FREESPACE.BLOCKSIZE + NONALLOCATEDSPACE.BLOCKSIZE) / (ALLOCATEDSPACE.BLOCKSIZE + NONALLOCATEDSPACE.BLOCKSIZE )) * 100 |
| PERCENTAGE USED | (USEDSPACE.BLOCKSIZE / (ALLOCATEDSPACE.BLOCKSIZE + NONALLOCATEDSPACE.BLOCKSIZE )) * 100 |
| PERCENTAGE SUBSCRIBED | (TOTAL VOLUME SIZE / (ALLOCATEDSPACE.BLOCKSIZE + NONALLOCATEDSPACE.BLOCKSIZE )) * 100 |

FIG. 13

| STANDARDIZED DATA | VENDOR-SPECIFIC IDENTIFIER |
|---|---|
| ALLOCATED_TB | ROUND (.ALLOCATED_TB) |
| USED SPACE ON POOL | N/A |
| FREE SPACE ON POOL | N/A |
| NON ALLOCATED SPACE | N/A |
| TOTAL_TB | ROUND (.TOTALSIZE) |
| AVAILABLE_TB | ROUND (.AVAILABLE) |
| USED_TB | ROUND (.AGGRSPACEATTRIBUTES.SIZEUSED) |
| PERCENTAGE FREE | N/A |
| USED_PCT | .USED |
| ALLOCATED_PCT | (.ALLOCATED_TB / TOTAL_TB) * 100 |

SYSTEMS AND METHODS FOR MULTI-VENDOR STORAGE INFRASTRUCTURE IN A DASHBOARD

CROSS-REFERENCE TO RELATED APPLICATION(S)

This application claims the benefit of priority under 35 U.S.C. § 119 from Indian Patent Application No. 202111025838, filed on Jun. 10, 2021 in the Indian Patent Office, the entire contents of which is incorporated herein by reference.

TECHNICAL FIELD

Various embodiments of the present disclosure relate generally to the field of data storage management and, more particularly, to monitoring and managing heterogeneous vendor data storage systems.

BACKGROUND

As entities adapt to ever-increasing amounts of data to manage, outside vendors are frequently used to provide systems and resources to store the data. However, outside vendors may not share a common data architecture with an entity or other outside vendors, or may not provide a common method to access or view stored data or the parameters associated with the stored data. For example, a vendor may refer to vendor-specific storage parameters such as deduplication, compression, unused space, used space, free space, and subscribed space. Vendor storage parameters may be accessed via custom vendor solutions that do not work with other vendor hardware. Additionally, even within a single vendor system, different storage devices may have different models, features, and/or firmware versions which may have differing storage parameters. Such multi-vendor solutions to provide data storage for an entity may be referred to as heterogeneous vendor data storage systems.

SUMMARY OF THE DISCLOSURE

According to certain aspects of the present disclosure, systems and methods are disclosed for monitoring and managing heterogeneous vendor data storage systems.

In one embodiment, a method is disclosed for monitoring and managing heterogeneous vendor storage systems, the method including: performing, by a processor of a management system, operations including: sending instructions to a vendor storage system among the heterogeneous vendor storage systems to cause the vendor storage system to generate a vendor answer file on the vendor storage system; sending instructions to the vendor storage system to copy vendor data from the generated vendor answer file to memory of the management system; tracking and logging events associated with the copying of the vendor data; validating the copied vendor data based on the logged events; determining standardized reporting data from the validated vendor data in the memory of the management system; saving the standardized reporting data in a data structure formatted for the heterogeneous vendor storage systems; receiving a user query regarding the saved standardized reporting data; and displaying the saved standardized reporting data in a user interface.

In accordance with an embodiment, a management system for monitoring and managing heterogeneous vendor storage systems includes: a memory to store instructions; and a processor to execute the stored instructions enabling: a data collector to: send instructions to a vendor storage system among the heterogeneous vendor storage systems to cause the vendor storage system to generate a vendor answer file on the vendor storage system, send instructions to the vendor storage system to copy vendor data from the generated vendor answer file to volatile memory of the management system, and track and log events associated with the copying of the vendor data; a business logic data converter to: validate the copied vendor data based on the logged events, determine standardized reporting data from the validated vendor data in the volatile memory of the management system, and save the standardized reporting data in a data structure formatted for the heterogeneous vendor storage systems; and a user interface to: receive a user query regarding the saved standardized reporting data; and display the saved standardized reporting data.

In accordance with an embodiment, a non-transitory computer readable medium stores instructions that, when executed by a processor of a management system, cause the management system to perform a method for monitoring and managing heterogeneous vendor storage systems, the method including: sending instructions to a vendor storage system among the heterogeneous vendor storage systems to cause the vendor storage system to generate a vendor answer file on the vendor storage system; sending instructions to the vendor storage system to copy vendor data from the generated vendor answer file to volatile memory of the management system; tracking and logging events associated with the copying of the vendor data; validating the copied vendor data based on the logged events; determining standardized reporting data from the validated vendor data in the volatile memory of the management system; saving the standardized reporting data in a data structure formatted for the heterogeneous vendor storage systems; receiving a user query regarding the saved standardized reporting data; and displaying the saved standardized reporting data in a user interface.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 10 depicts an example display for monitoring historical data of a first sub-group of heterogeneous vendor data storage systems, according to one or more embodiments.

FIG. 12 depicts a process flow for retrieving data from a first vendor device and displaying standardized data, according to one or more embodiments.

FIG. 13 depicts an example reference table correlating vendor storage identifiers from a first vendor device with standardized data, according to one or more embodiments.

DETAILED DESCRIPTION OF EMBODIMENTS

The following embodiments describe systems and methods for data storage management and, more particularly, for monitoring and managing heterogeneous vendor data storage systems.

Entities would prefer to interact with the heterogeneous vendor data storage systems while using a common interface, so that regardless of a particular vendor storage configuration, a user may monitor and manage the heterogeneous vendor data storage systems from a single integrated and cohesive interface. However, current products available in the market do not cover such management of heterogeneous vendor data storage systems. Current products also do not provide an option to perform self-healing, integration with ticketing tools, or cover an end to end business process. Even current products for managing individual vendor data storage systems are bulky in size and require dedicated computing system and human resources to install, manage, monitor, and report.

Current products do not interpret vendor data in a simple format. Consequently, entities must employ specialists to interpret the varying data formats, which results in increased costs and time delays in receiving critical information regarding vendor data storage systems. Additionally, current products do not provide an automated configuration change process that is adaptable along with expanding company governance policies.

The present disclosure is directed to overcoming one or more of these above-referenced challenges.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description.

Various non-limiting embodiments of the present disclosure will now be described to provide an overall understanding of the principles of the structure, function, and use of systems and methods disclosed herein for monitoring and managing heterogeneous vendor data storage systems.

One or more examples of these non-limiting embodiments are illustrated in the selected examples disclosed and described in detail with reference to the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1:
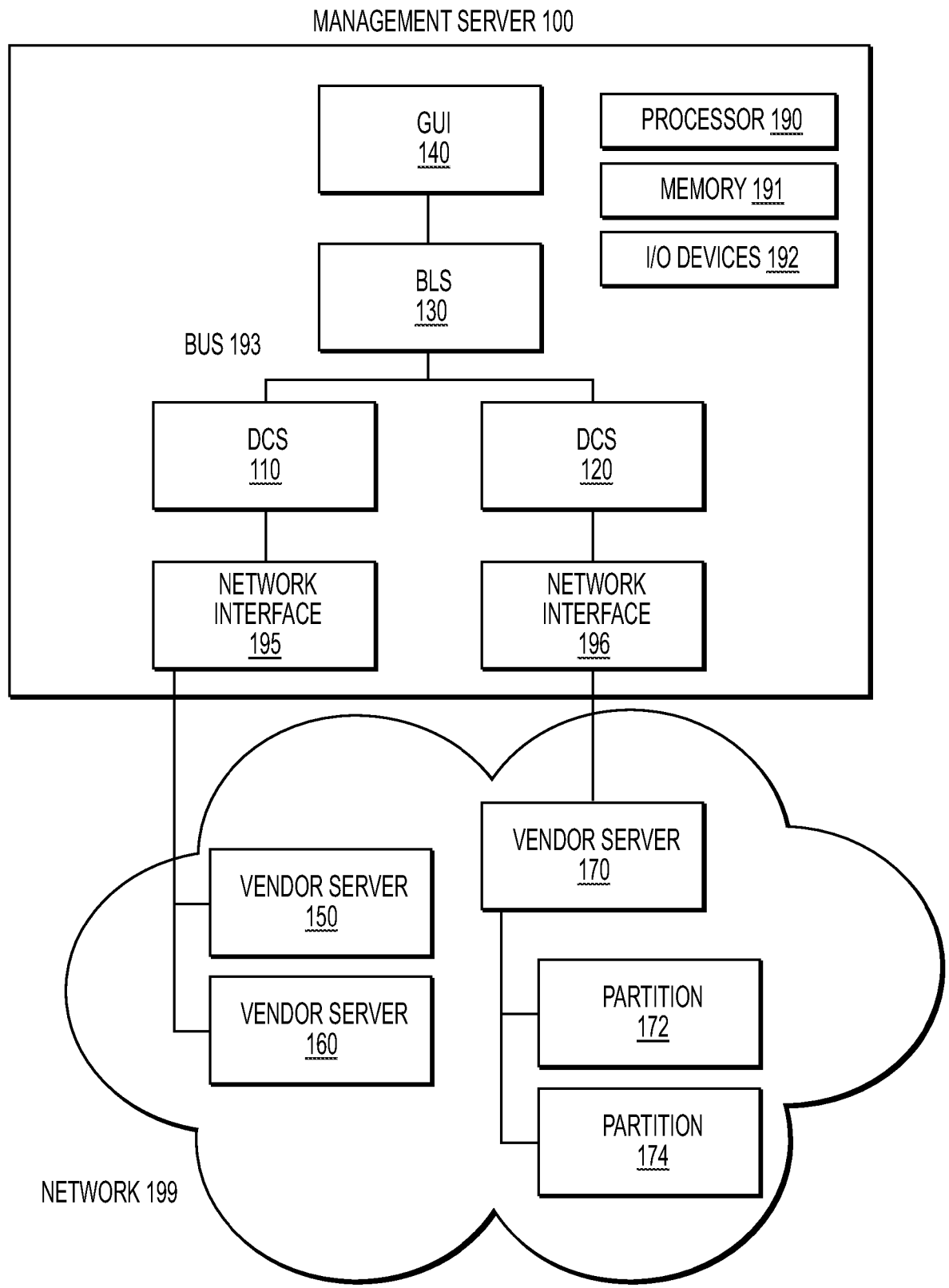
FIG. 1 depicts a block diagram of an example data storage management system of monitoring and managing heterogeneous vendor data storage systems, according to one or more embodiments.

FIG. 1 depicts a block diagram of an example data storage management system of monitoring and managing heterogeneous vendor data storage systems, according to one or more embodiments.

In general, the system may be implemented on a management server 100, which may include a Data Collection Script (DCS) implemented as DCS 110 and DCS 120, a Business Logic Script (BLS) implemented as BLS 130, and a Graphical User Interface (GUI) implemented as GUI 140. The system may use an Application Programming Interface (API) call, for example, to a vendor storage device, such as a vendor server 150, to retrieve vendor-format data and convert the retrieved vendor-format data into standard-format data. The standard-format data may be displayed on a user interface, such as GUI 140, providing an overview of a plurality of heterogeneous vendor storage devices and/or systems. Additionally, from the GUI 140, a user may change a configuration of an individual vendor storage device and/or group of vendor storage devices.

DCS 110 may be network-connected, via network interface 195, to vendor server 150 (or vendor storage device 150) and vendor server 160 (or vendor storage device 160), which may be homogeneous vendor servers. DCS 120 may be connected, via network interface 196, to vendor server 170 (or vendor storage device 170), which may be provided by a different vendor from vendor server 150 or may be provided by the same vendor as vendor server 150 but may be a different model, have different features, and/or have different firmware versions, and may therefore be considered as a heterogeneous server relative to vendor server 150. Vendor server 170 may be partitioned into two virtual drives, partition 172 and partition 174. DCS 110 and 120 may both be linked to the GUI 140 through the BLS 130.

The instructions for the DCS 120 may be implemented in PowerShell and/or Python, for example. The instructions for the BLS 130 may be implemented in open source code including Papa Parse, C3.js, and/or jQuery, for example. The instructions for the GUI 140 may be implemented using HTML, CSS, JavaScript, and/or NODE.js, for example. However, the above examples are merely provided for illustration, and the disclosure is not limited to the above implementations.

Figure 2:
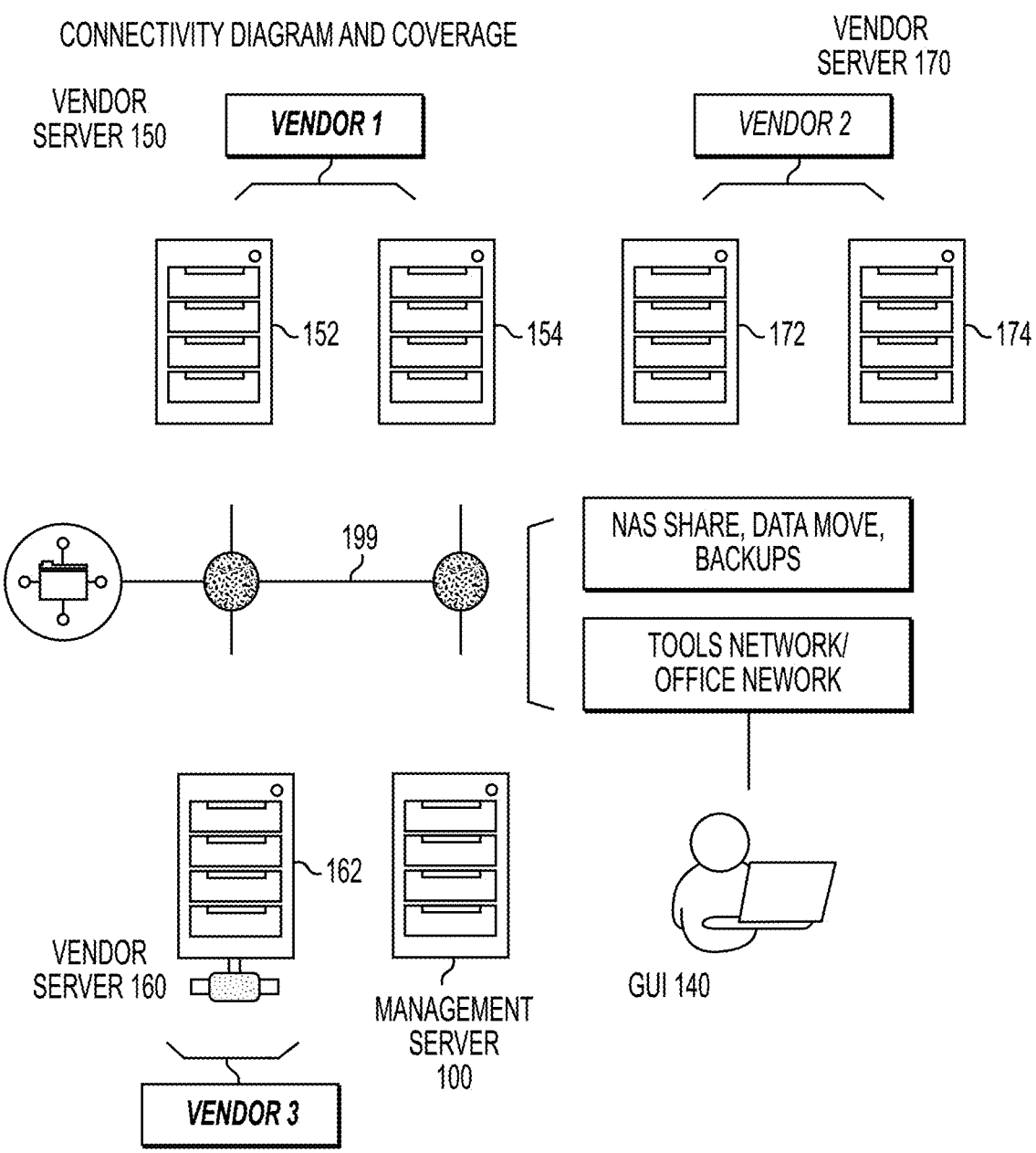
FIG. 2 depicts an example network connectivity diagram, according to one or more embodiments.

FIG. 2 depicts an example network connectivity diagram, according to one or more embodiments.

FIG. 2 illustrates a plurality of vendor servers 150, 160, and 170 connected to a management server 100 via a network 199. One or more of the vendor servers labeled 150, 160, and 170 in FIG. 2 may each be a vendor system comprising multiple servers or storage devices, as illustrated in FIG. 2. For example, vendor system 150 for vendor 1 may comprise servers or storage devices 152 and 154, and vendor system 170 for vendor 2 may comprise servers or storage devices or partitions 172 and 174. Vendor system 160 for vendor 3 may comprise a server or storage device 162. One or more DCS modules such as DCS 110 and/or DCS 120, implemented on the management server 100, may collect data from one or more of the vendor storage systems 150, 160, and 170.

Figure 3:
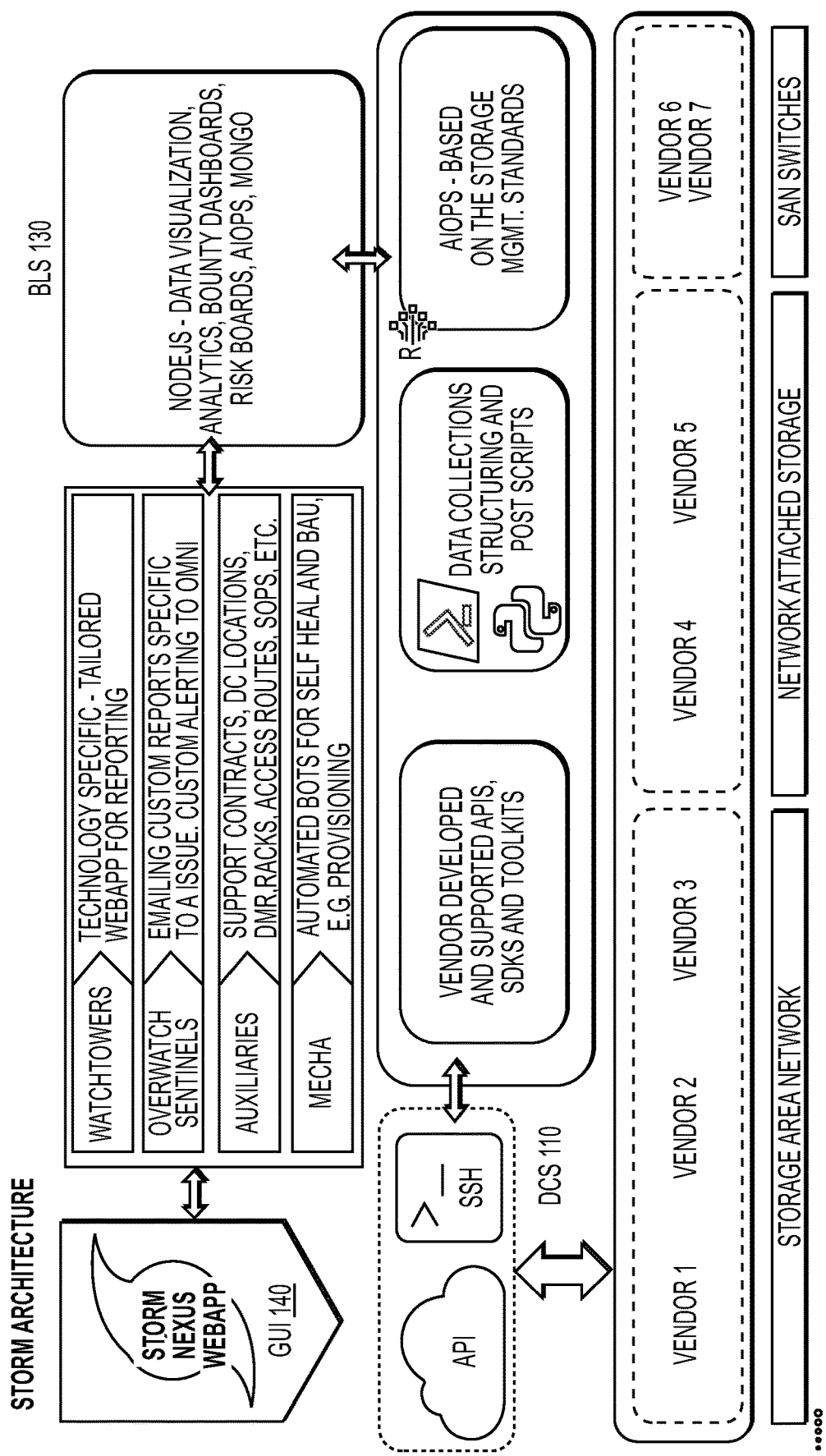
FIG. 3 depicts an example software architecture of the data storage management system, according to one or more embodiments.

FIG. 3 depicts an example software architecture of the data storage management system, according to one or more embodiments.

The system architecture may include a graphical user interface (e.g., GUI 140) including features such as watchtowers, overwatch sentinels, auxiliaries, and Mecha. The watchtowers may be technology-specific and provide tailored web applications for reporting. The overwatch sentinels may provide capabilities to email custom reports specific to an issue, and custom alerts. The auxiliaries may support contracts, data center locations, downstream message routers, racks, access routes, standard operating procedures (SOPs), etc. The Mecha may provide automated bots or programs for self-healing and Business as Usual (BAU) operations such as provisioning.

The system architecture may include BLS 130 including features such as data visualization, analytics, bounty dashboards, risk boards, Artificial Intelligence for Information Technology Operations (AIOPS), which may be implemented with PowerShell and NODE.js using data from Comma Separated Values (CSV) and MongoDB, for example.

The system architecture may include one or more data collection scripts (e.g., DCS 110) including features such as vendor developed and supported APIs, Software Development Kits (SDKs), and other toolkits. DCS 110 may further provide data collection, structuring, and post script capabilities. Additionally, DCS 110 may provide AIOPS based on storage management standards.

The system architecture providing heterogeneous vendor storage solutions may include a plurality of vendor servers (e.g., vendors 1-7) implemented using different network or storage technologies. For example, vendors 1-3 may be implemented using a Storage Area Network (SAN), vendors 4-5 may be implemented using a Network Attached Storage (NAS), and vendors 6-7 may be implemented using SAN switches.

Figure 4:
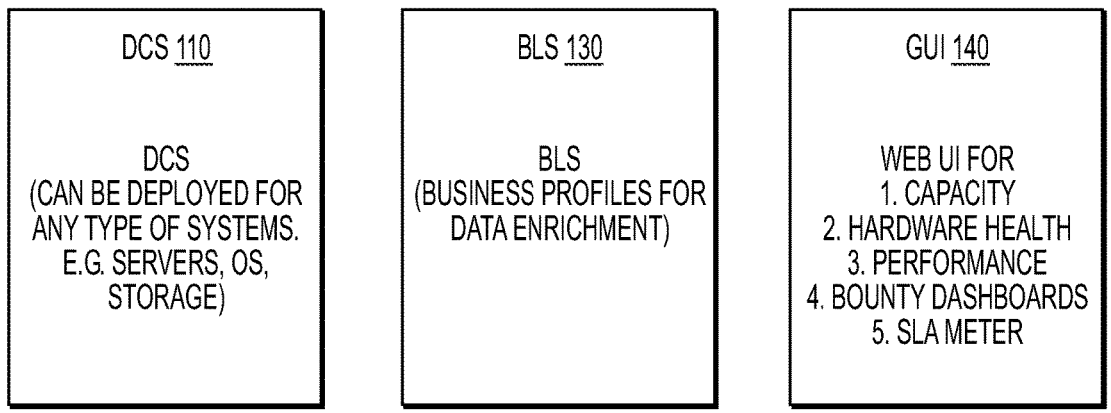
FIG. 4 depicts three high-level software modules of the data storage management system, according to one or more embodiments.

FIG. 4 depicts three high-level software modules of the data storage management system, according to one or more embodiments.

The DCS 110 may be deployed for any type of system, such as a server, an operating system, or a storage device, for example. The DCS 110 may be a script or collection of scripts to log in to a system if necessary and collect one more properties of the system. For example, DCS 110 may collect data related to system storage space utilization. The DCS 110 may also include a log to track event errors, successes, and/or failures for code audits and enhancements.

The BLS 130 may provide business profiles for data enrichment. A script or collection of scripts read the data from DCS 110, and converts the read data from DCS 110 to information using logic bound to a Line of Business (LOB), such as interacting with GUI 140 to provide a proactive notification highlighting a list of vendor storage devices (150) that have crossed a usage threshold. The BLS 130 may use structured data saved to a database, or saved as a Comma Separated Values (CSV) file for the GUI 140.

The GUI 140 may provide information such as device capacity, hardware health, performance, bounty dashboards, and Service Level Agreements (SLA) meters in a readily viewable form. The GUI 140 provides a collection of tools and code to interpret data from the BLS 130 in tabular and/or graphical form.

Figure 5:
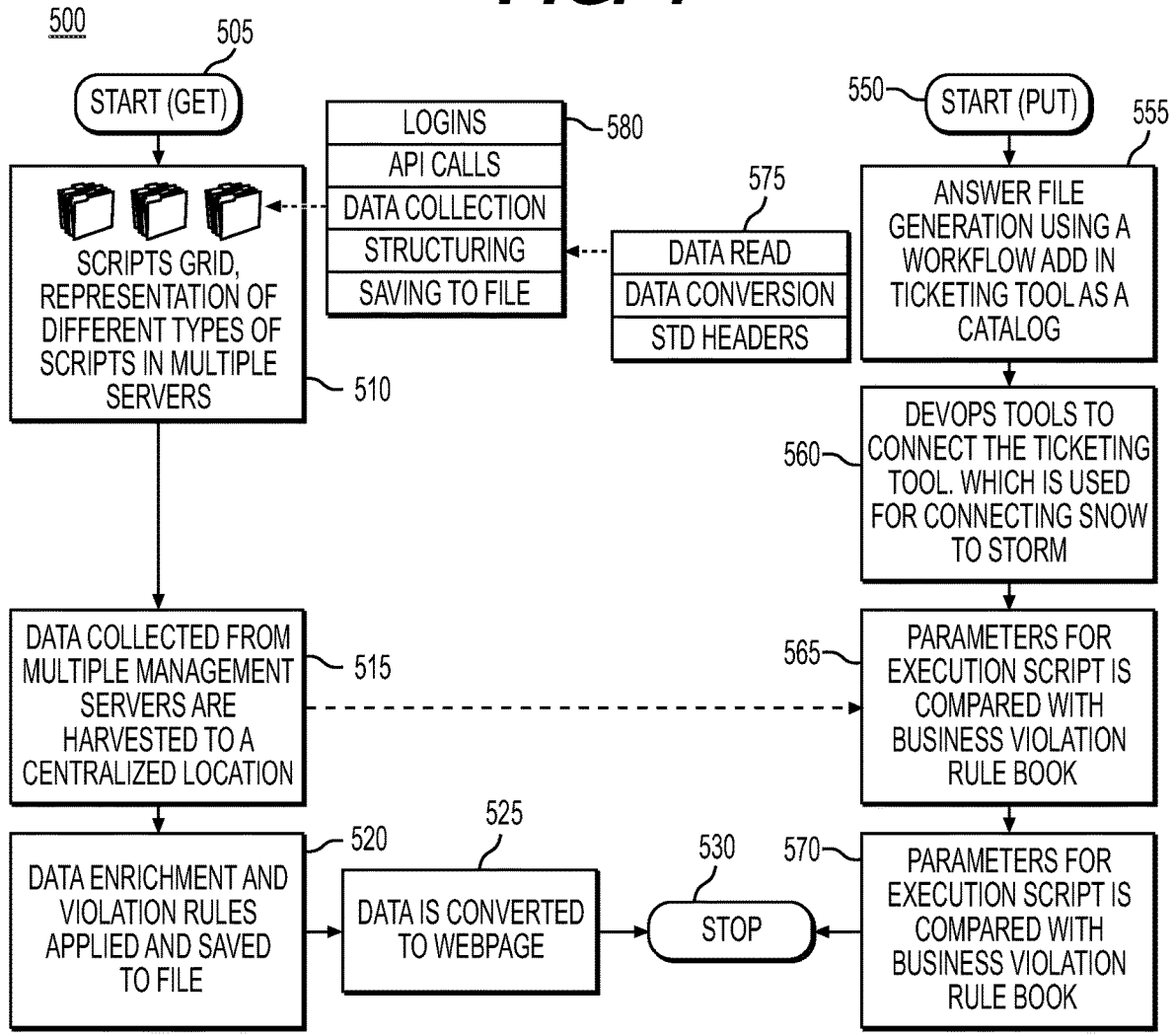
FIG. 5 depicts a block diagram illustrating an example process logic flow for monitoring and managing heterogeneous vendor data storage systems, according to one or more embodiments.

FIG. 5 depicts a block diagram of an example process logic flow 500 for monitoring and managing heterogeneous vendor data storage systems, according to one or more embodiments.

The DCS 110 may be considered to be a data harvester from vendor storage devices. Scripts of any programming language configured to implement certain application programming interface (API) operations, such as "get" and "put" operations, may be placed in a server. Data collection may be scheduled as needed depending on the urgency of the data. Because the data is inter-related, the data may be used for many different types of analyses. The system is platform independent so that components may be independently developed and implemented, as long as the output of the components follow a common architecture.

Structuring the data may include collecting data from multiple vendors and entities using, e.g., API calls, and formatting the collected data to a tabular format with standard header names. The output may be created as a file and saved in a management server 100. The system may include additional automation to validate the collected data prior to usage. Business specific data transformation may be applied, and the collected data may be enriched. The information may be visualized using a GUI 140. The implementation results may be captured for audits and other business workflows.

In process logic flow 500, DCS 110 may use a get operation 505 to collect data from multiple servers in operation 510. The collected data may be centralized in operation 515, validated and saved to a file in operation 520, and converted to a webpage for display in operation 525. Operation 530 may represent an end point for process 500 for converging processes. Process 500 may also use a put operation 550 to generate an answer file (operation 555) based on a workflow addition in a ticketing tool, where data is converted as needed in operation 575, and saved to a file in operation 580 to change a configuration of a server used in operation 510. Additionally, the answer file generated in operation 555 links the ticketing tool to the data storage management system in operation 560, where parameters from the workflow addition and data collection may be separately validated in operation 565, with a final validation in operation 570 for execution.

Figure 6:
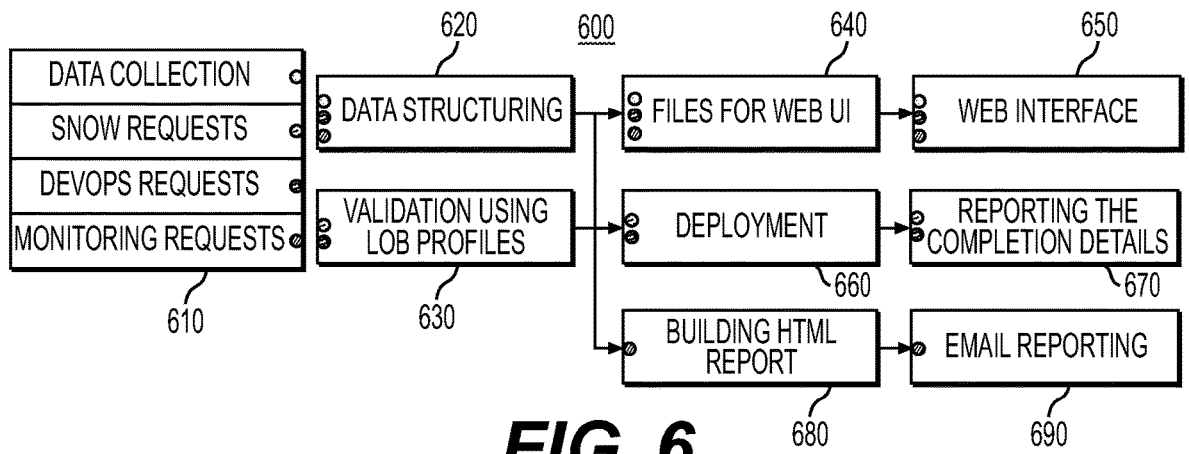
FIG. 6 depicts a block diagram illustrating example modules for monitoring and managing heterogeneous vendor data storage systems, according to one or more embodiments.

FIG. 6 depicts a block diagram illustrating example modules for monitoring and managing heterogeneous vendor data storage systems, according to one or more embodiments.

The system 600 may include such sub-modules for the GUI 140, BLS 130, and DCS 110 as data collecting 610, data structuring 620, data validation 630, GUI creation 640 and interface 650, deployment 660 and deployment reporting 670, and html building 680 and email reporting 690, for example.

Figure 7:
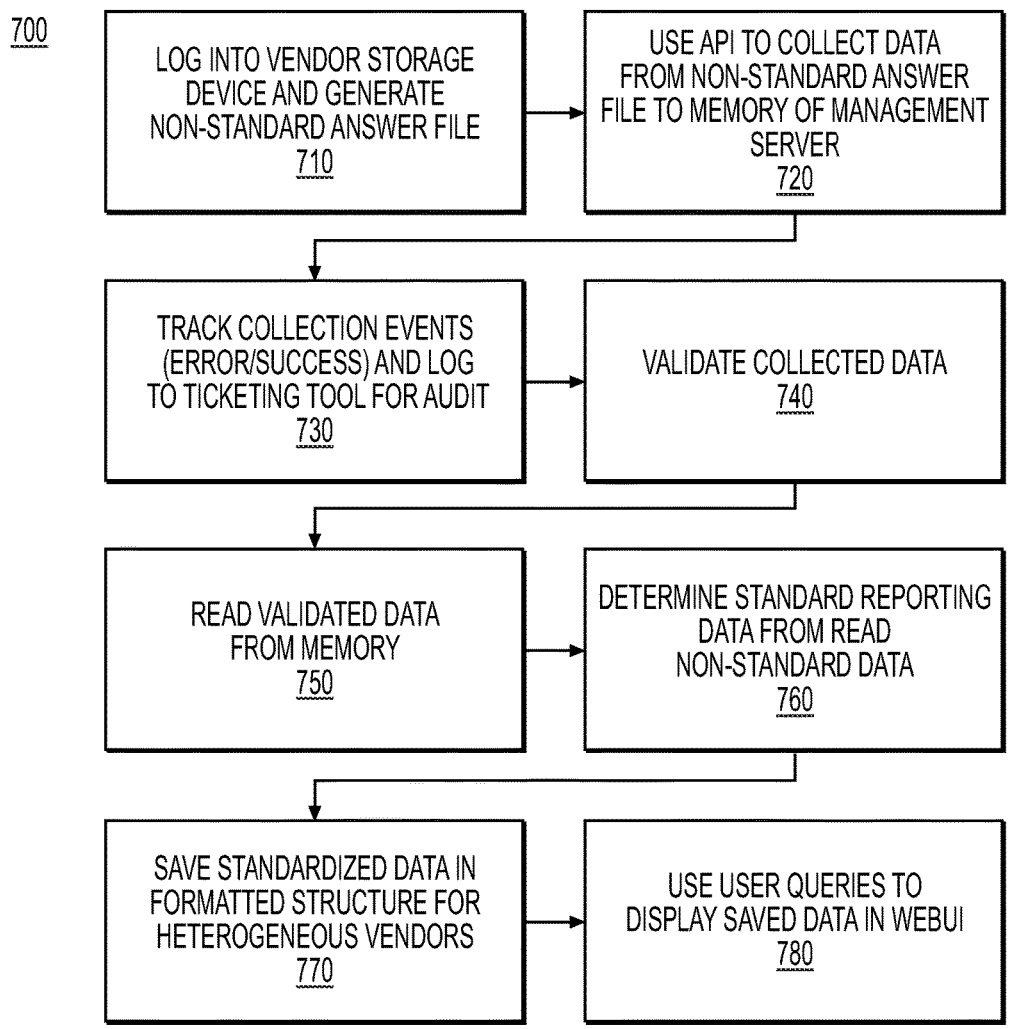
FIG. 7 depicts a process flow for retrieving data from vendor devices and displaying standardized data, according to one or more embodiments.

FIG. 7 depicts a process flow for retrieving data from vendor devices and displaying standardized data using GUI 140, BLS 130, and DCS 110, according to one or more embodiments.

The process 700 may include DCS 110 using a script to log into a vendor storage device 150 and generate a non-standard answer file on vendor storage device 150 (operation 710) as a volatile or non-volatile instance. DCS 110 may use an API to collect data from the generated non-standard answer file to volatile or non-volatile memory of management server 100 (operation 720). DCS 110 may track collection events (with error or success) and log the events to a ticketing tool (not shown) for audit (operation 730). DCS 110 may validate the collected data (operation 740) using the logged events. BLS 130 may read the validated data from volatile memory of the management server 100 (operation 750). BLS 130 may determine standard reporting data from the read non-standard data (operation 760), and save the standardized data in a formatted structure for heterogeneous vendors (operation 770). GUI 140 may display saved data in a graphical user interface (e.g., Web UI) in response to user queries to the management server 100 (operation 780).

Figure 8:
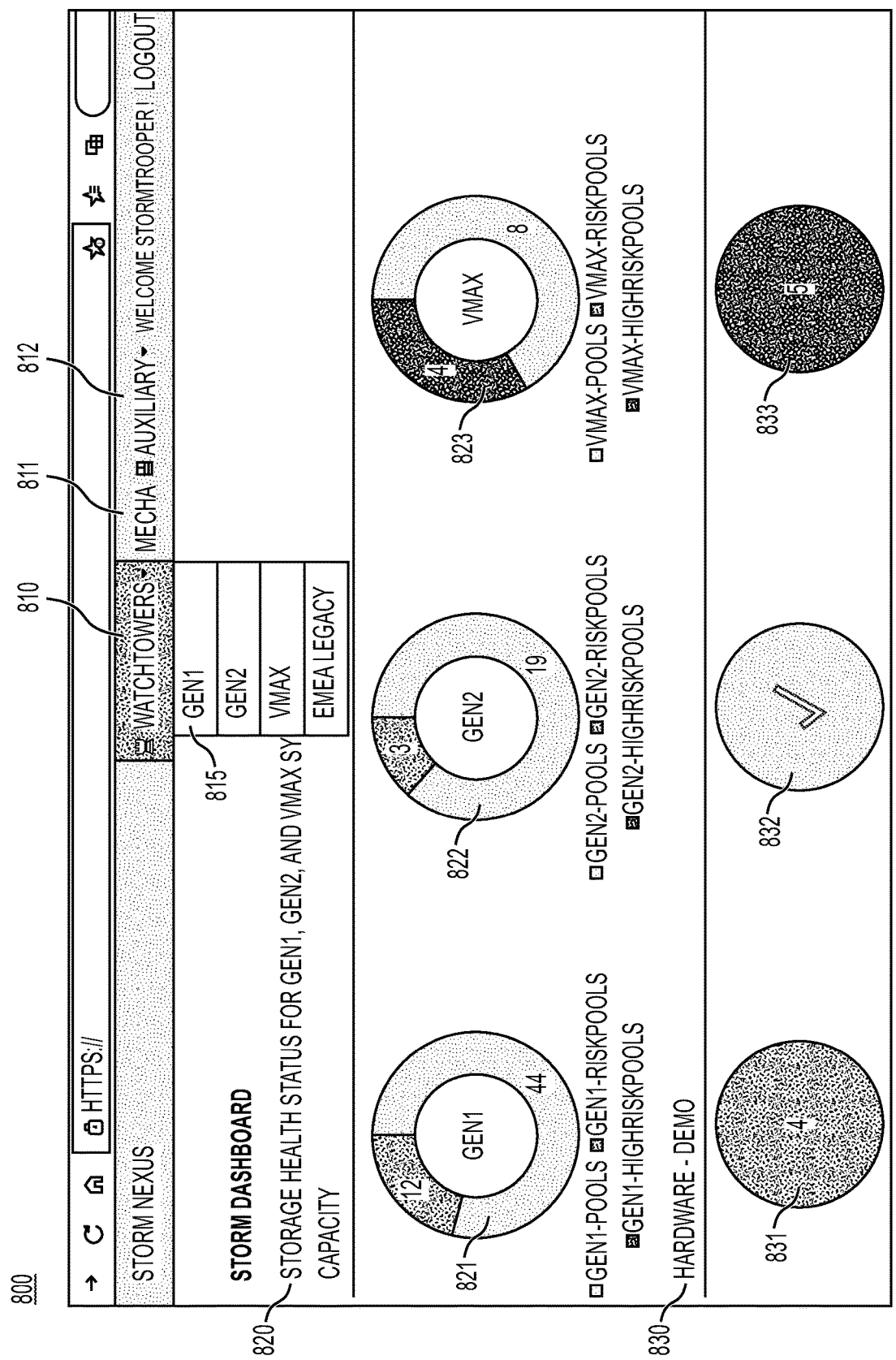
FIG. 8 depicts an example display for monitoring and managing heterogeneous vendor data storage systems, according to one or more embodiments.

FIG. 8 depicts an example display 800 of GUI 140 for monitoring and managing heterogeneous vendor data storage systems, according to one or more embodiments. In particular, the display in FIG. 8 provides a high-level overview of the vendor storage devices being monitored and managed by the management server 100.

The GUI 140 may display the standard format data in a variety of group configurations. For example, the standard format data may be displayed as separate web interfaces for different vendors, geographical areas, or networks.

The display 800 may include buttons for watchtowers 810, Mecha 811, and auxiliaries 812, which, when selected, may each include a drop down list to select systems such as shown in the illustrated example including various vendor systems such as GEN1 815, GEN2, VMAX, and EMEA LEGACY. The display 800 may provide an overview 820 for a status of a plurality of vendor systems, such as GEN1 821, GEN2 822, and VMAX 823. The display 800 may provide a health indicator in section 830 for each, such as indicators 831, 832, and 833 correlating with GEN1 821, GEN2 822, and VMAX 823.

Figure 9:
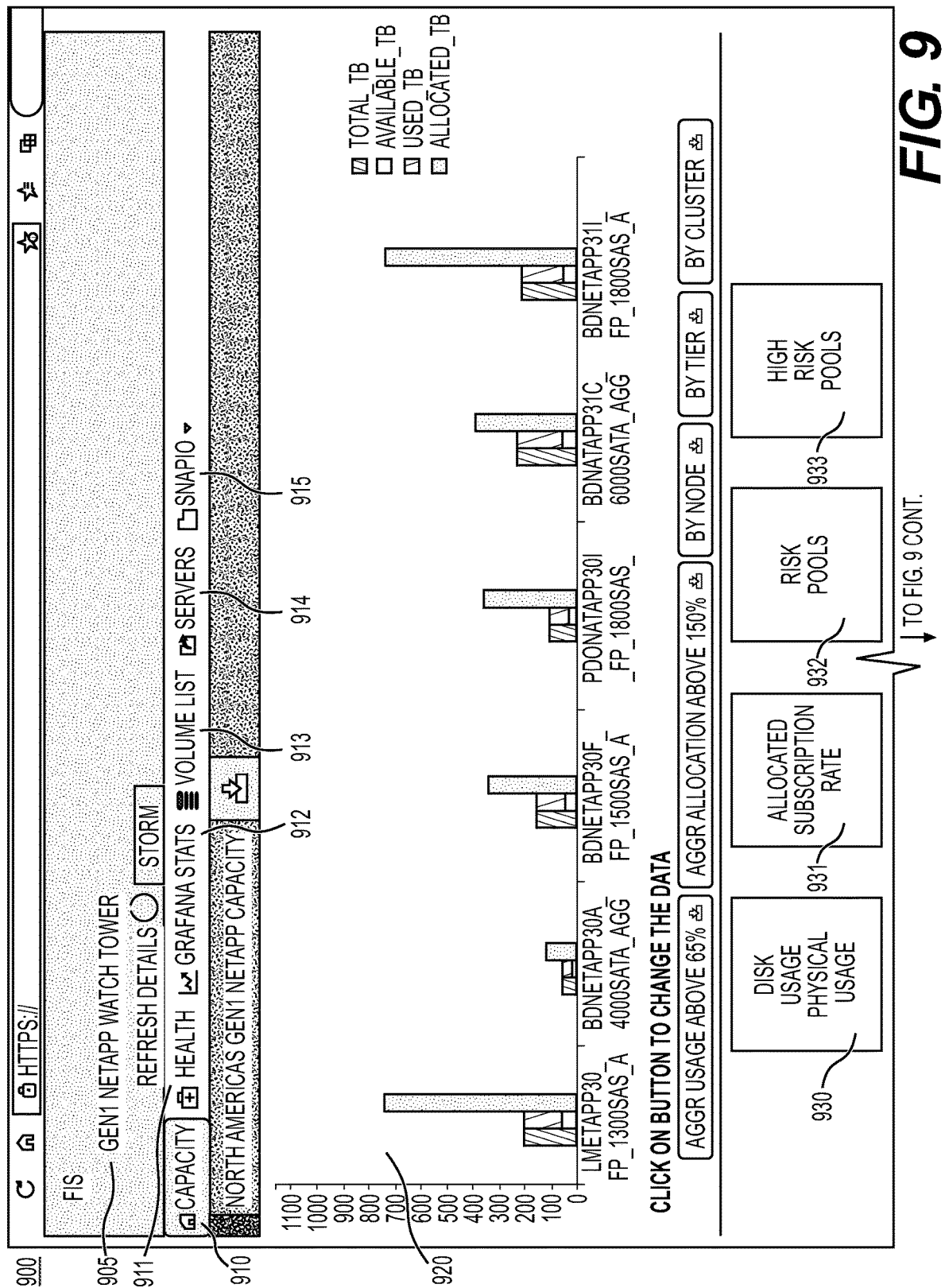
FIG. 9 depicts an example display for monitoring a first sub-group of heterogeneous vendor data storage systems, according to one or more embodiments.

FIG. 9 depicts an example display 900 of GUI 140 for monitoring a first sub-group 905 of heterogeneous vendor data storage systems, according to one or more embodiments. FIG. 10 depicts an example display 1000 for monitoring historical data of a first sub-group of heterogeneous vendor data storage systems, according to one or more embodiments.

Each interface 900 may include a plurality of display groups with selectable buttons, such as Vendor Storage Capacity 910, Health 911, Performance 912, Volume List 913, Servers 914, and Alerts (SNAPIO) 915, for example. Interface 900 may include chart 920 illustrating data provided in a graphical format.

Each display group may provide data for a plurality of individual devices arranged in rows 950 under standard data headers arranged in columns. Data may be available for disk usage 930, allocation rate 931, risk pool 932, and high-risk pool 933.

Vendor Storage Capacity may include data such as DC, Cluster, IP, Node, Tier, Aggr, Total_TB, Used_TB, Available_TB, Allocated_TB, Used_Pct, Allocated_Pct, Disks, and Vols, for example.

Vendor Storage Health may include data such as DC, Array, Model, TotalSpace, FreeSpace, UsedSpace, SubscribedSpace, PercentageFree, PercentageUsed, PercentageSubscribed, for example.

Vendor Storage Performance may include data such as Array, StorageGroupName, PercentStable, PercentMarginal, PercentCritical, Latency, Input/output operations per second (IOPS), Throughput, CPU Memory (Free, Used, and Total), AvgExpectedResponseTime, NumOfWorkloads, NumOfStorageGroups, for example.

Vendor Storage Volume List may include data such as Array, VolumeID, VolType, AllocatedPercent, CapGB, Status, Reserved, Pinned, Encapsulated, PhysicalName, VolumeIdentifier, WWN, PoolID, NumOfStorageGroups, NumOfFrontEndPaths, for example.

Vendor Storage Servers may include data such as Array, hostGroupID, HostID, Server World Wide Name (WWN), StorageGoupID, Cap_GB, for example.

Display 1000 may provide historical alerts or snaps when SNAPIO 915 tab is selected, with aggregated data for a number of snaps 1010, storage consumed 1011, cost avoidance 1012, and row data 1020 to provide individual data points.

Figure 11:
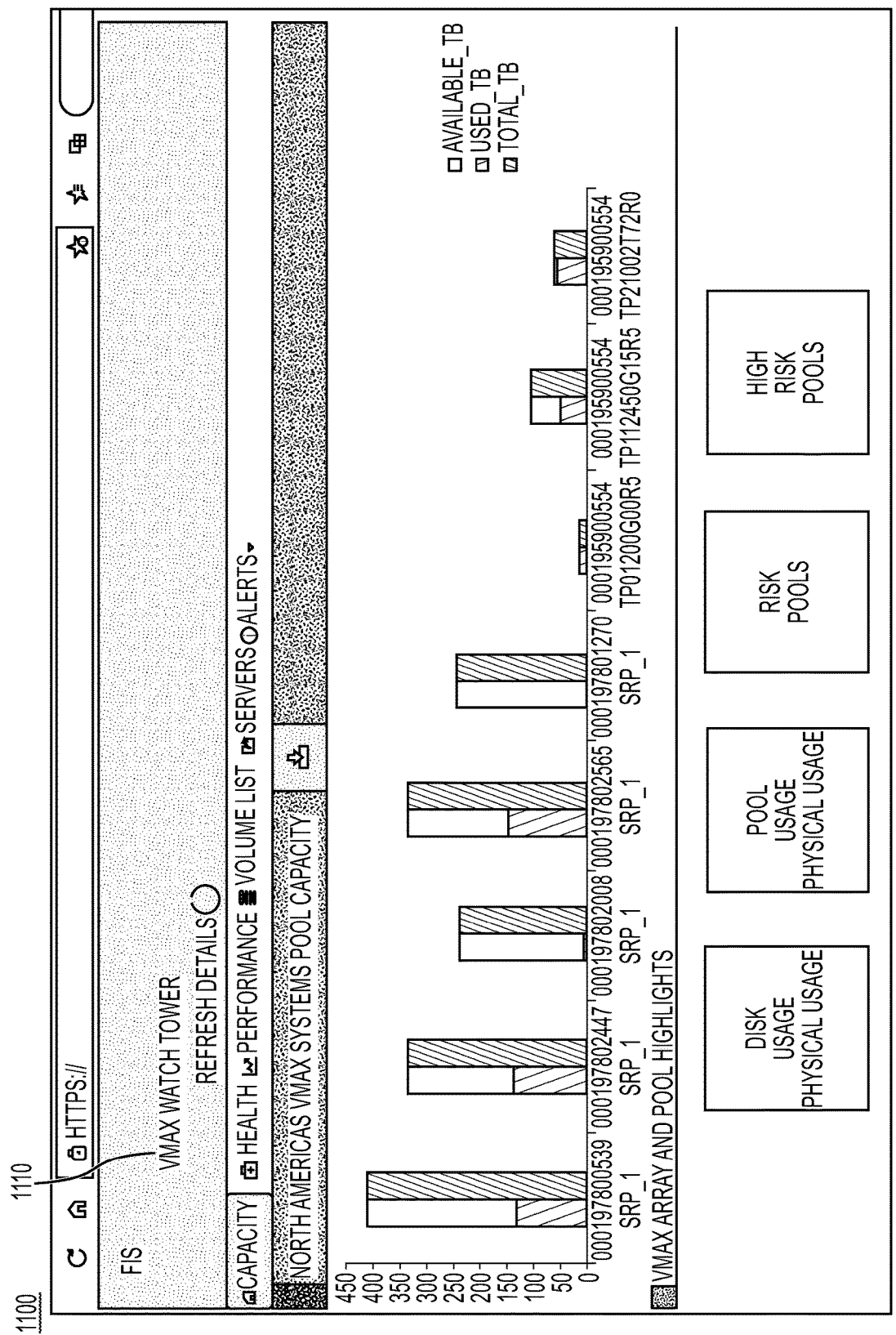
FIG. 11 depicts an example display for monitoring a second sub-group of heterogeneous vendor data storage systems, according to one or more embodiments.

FIG. 11 depicts an example display 1100 for monitoring a second sub-group 1110 of heterogeneous vendor data storage systems, according to one or more embodiments.

Similarly to the first sub-group, the second sub-group may provide data for a plurality of individual devices arranged in rows under standard data headers arranged in columns. The standard headers in the second sub-group may be the same as the first sub-group, or may be different from the first sub-group.

FIG. 12 depicts a process flow for retrieving data from a first vendor device and displaying standardized data, according to one or more embodiments. FIG. 13 depicts an example reference table correlating vendor storage identifiers from a first vendor device with standardized data, according to one or more embodiments.

The method 1200 may be performed by the management server 100, or components therein such as the BLS 130 and/or DCS 110, 120. In one or more embodiments, the data storage management system may use a vendor storage API to log into a vendor storage device using a user name and password (operation 1210). The data storage management system may determine a tier and a volume of the vendor storage device (operation 1220). The data storage management system may retrieve vendor-format attributes of the vendor storage device for each volume of the vendor storage device (operation 1230). The attributes may include data related to the overall usage and performance of the vendor storage device. The vendor-format attributes may be transformed to standard-format data by the data storage management system. The standard-format data may be saved to non-volatile memory of the vendor storage device or the management server as an answer file in the form of a comma separated value (.csv) file, for example (operation 1240). The answer file may contain standard-format data for a single volume of a vendor storage device, standard-format data for multiple volumes of a single vendor storage device, or standard-format data for multiple volumes of multiple vendor storage devices, for example. The standard-format data from multiple sources may be compiled by the data storage management system into another .csv file (operation 1250) for retrieval by GUI 140 (operation 1260).

As illustrated in FIG. 13, a vendor storage device (e.g., vendor server 150) may include vendor-format attributes such as AllocatedSpace.blocksize, UsedSpace.blocksize, FreeSpace.blocksize, NonAllocatedSpace.blocksize, NonAllocatedSpace.blocksize, for example. The vendor storage device may also include attributes such a size of a volume of the vendor storage device. Accordingly, the data storage management system may determine a Total Volume Size of the vendor storage device from the individual sizes of the volumes of the vendor storage device.

The standard-format data may include such headers as Allocated to Pool Space, Used Space on Pool, Free Space on Pool, Non Allocated Space, Total Space (TB), Free Space (TB), Used Space (TB), Percentage Free, Percentage Used, and Percentage Subscribed.

The data storage management system may assign data in vendor-format attribute "AllocatedSpace.blocksize" to standard-format data "Allocated to Pool Space". The instructions may assign data in vendor-format attribute "UsedSpace.blocksize" to standard-format data "Used Space on Pool". The instructions may assign data in vendor-format attribute "FreeSpace.blocksize" to standard-format data "Free Space on Pool". The instructions may assign data in vendor-format attribute "NonAllocatedSpace.blocksize" to standard-format data "Non Allocated Space". The instructions may assign data in vendor-format attribute "UsedSpace.blocksize" to standard-format data "Used Space (TB)".

The data storage management system may determine standard-format data "Total Space (TB)" by using data in vendor-format attributes in the equation "AllocatedSpace.blocksize+NonAllocatedSpace.Blocksize". The instructions may determine standard-format data "Free Space (TB)" by using data in vendor-format attributes in the equation "NonAllocatedSpace.blocksize+FreeSpace.blocksize". The instructions may determine standard-format data "Percentage Free" by using data in vendor-format attributes in the equation "((FreeSpace.blocksize+NonAllocatedSpace.Blocksize)/(AllocatedSpace.blocksize+NonAllocatedSpace.Blocksize))*100". The instructions may determine standard-format data "Percentage Used" by using data in vendor-format attributes in the equation "(UsedSpace.blocksize/(AllocatedSpace.blocksize+NonAllocatedSpace.Blocksize))*100". The instructions may determine standard-format data "Percentage Subscribed" by using data in vendor-format attributes in the equation "(Total Volume Size/(AllocatedSpace.blocksize+NonAllocatedSpace.Blocksize))*100".

The instructions may use the standard-format data in the answer file to create a user interface such as GUI 140 to view the standard-format data in a graphical format.

Figures 14, 15:
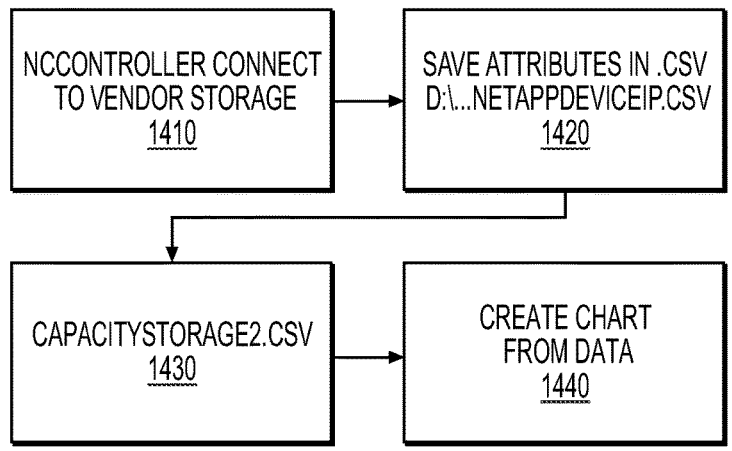
FIG. 14 depicts a process flow for retrieving data from a second vendor device and displaying standardized data, according to one or more embodiments.
FIG. 15 depicts an example reference table correlating vendor storage identifiers from a second vendor device with standardized data, according to one or more embodiments.

FIG. 14 depicts a process flow for retrieving data from a second vendor device and displaying standardized data, according to one or more embodiments. FIG. 15 depicts an example reference table correlating vendor storage identifiers from a second vendor device with standardized data, according to one or more embodiments.

As illustrated in FIGS. 14 and 15, a second vendor storage device (e.g. vendor server 170) may include vendor-format attributes similar to the first vendor storage device, or different from the first vendor device. For example, as shown in FIG. 15, some vendor-format attributes of the second vendor storage device may be different from vendor-format attributes of the first vendor storage device, or vendor-format attributes of the first vendor storage device may not be available in the second vendor storage device. The instructions to retrieve vendor-format attributes of the second vendor storage device may be the same as instructions for the first vendor storage device, or may be different depending on the particular characteristics of the second vendor storage device. For example, as illustrated in method 1400 of FIG. 14, the method 1400 may be performed by the management server 100, or components therein such as the BLS 130 and/or DCS 110, 120. In one or more embodiments, the data storage management system may connect directly to a vendor storage device (operation 1410). The data storage management system may retrieve vendor-format attributes of the vendor storage device, the vendor-format attributes may be transformed to standard-format data by the data storage management system, and the standard-format data may be saved to non-volatile memory of the vendor storage device or the management server as an answer file in the form of a comma separated value (.csv) file, for example (operation 1420). The answer file may contain standard-format data for a single volume of a vendor storage device, standard-format data for multiple volumes of a single vendor storage device, or standard-format data for multiple volumes of multiple vendor storage devices, for example. The standard-format data from multiple sources may be compiled by the data storage management system into another .csv file (operation 1430) for retrieval by GUI 140 (operation 1440).

Figure 16:
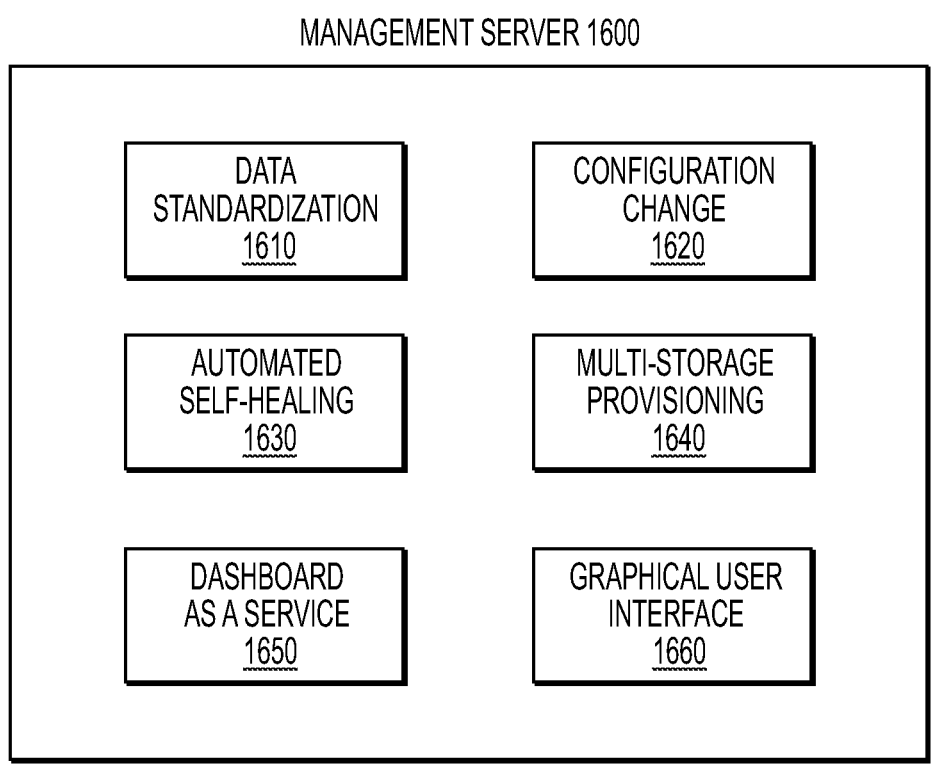
FIG. 16 depicts a block diagram of an example system of monitoring and managing heterogeneous vendor data storage systems, according to one or more embodiments.

FIG. 16 depicts a block diagram of an example system of monitoring and managing heterogeneous vendor data storage systems, according to one or more embodiments.

In one or more embodiments, a user may input a requested configuration change for a vendor storage device into a ticketing tool. The requested configuration change may include a request to increase a virtual storage capacity of a volume, for example. Management server 1600 may use a vendor storage API to log into a vendor storage device using a user name and password. The configuration change component 1620 of the management server 1600 may transform the requested configuration change from the ticketing tool into a vendor specific format, and update the vendor storage device using the configuration change in the vendor specific format. The configuration change component 1620 may query the vendor storage device to determine whether the configuration was successfully applied, and log the configuration change. The configuration change component 1620 may provide a message to the ticketing tool indicating the requested configuration change was successfully applied.

The management server 1600 may include a data standardization component 1610. Vendors have different ways of interpreting similar data, which may confuse system administrators and/or delay responses when handling multi-vendor storage systems. By using data standardization, system administrators and others may more easily read the data and take appropriate actions. Data collection may be performed using API or Secure Shell Protocol (SSH), for example. Collected data may be formatted in such a way that the data representing a vendor specific term is converted to an Industry standard form. LOB thresholds may be applied on the data for analytics, the information may be enriched and validated, and execution logs may be captured. The final data may be converted to CSV UTF-8 format, for example, and saved locally for general access by a GUI 1660. As an example of data standardization, vendor specific data may include Active space, Allocated space, and Unallocated space, which may be standardized to Total Space, Used Free Space, and Subscribed space. The data may be used for replication data and/or snapshot interpretations. The standardized data may be visualized into charts, where a violation of LOB rules may be highlighted for operational stability. The standardized data may be used during implementation for go/no-go scenarios to avoid issues related to data storage.

The management server 1600 may include an automated self-healing component 1630. An alert may be generated from a device connected to the management server 1600, which may trigger a business governance model and workflow with technical and business validations. To address the condition(s) indicated in the alert, the management server 1600 may implement an automated self-healing algorithm by way of the automated self-healing component 1630, and may provide a signal to a ticketing tool for review.

The management server 1600 may include a multi-storage provisioning component 1640 to enable multi-storage provisioning as a service. Such a method integrates any ticketing tool (business governance) to fully automate a volume provisioning request from any vendor of choice. This may help a company to adapt to any storage vendor without worrying about requiring new programming operations. The front end of the tool may be configured on a ticketing tool with a designed workflow for billing and technical validation, including intake and completion.

The management server 1600 may include a dashboard as a service component 1650. The dashboard as a service component 1650 may enable separation from a front-end interface, and may allow the management server 1600 to attach or connect to any source of data to represent that infrastructure. For example, a dashboard may be displayed via the GUI 1660, and leveraged to a database team, data back-ups, or an operating system platform to view and analyze various network and storage environments.

The techniques disclosed in the present disclosure result in technical improvements in the field of data storage management, by allowing entities to interact with heterogeneous vendor data storage systems while using a common interface, so that regardless of a particular vendor storage configuration, a user may monitor and manage the heterogeneous vendor data storage systems from a single integrated and cohesive interface. The techniques disclosed in the present disclosure provide an option to perform self-healing, integration with ticketing tools, and cover an end to end business process. The techniques disclosed in the present disclosure are small in size and do not require dedicated computing systems and human resources to install, manage, monitor, and report. The techniques disclosed in the present disclosure interpret vendor data in a simple format. Consequently, entities do not have to employ specialists to interpret the varying data formats, which results in decreased costs and time delays in receiving critical information regarding vendor data storage systems. Additionally, the techniques disclosed in the present disclosure provide an automated configuration change process that is adaptable along with expanding company governance policies.

The processes described herein may be performed on or between one or more computing devices that are specially configured to perform the processing described herein. Referring to FIG. 1, an example computing device implemented as a management server 100 is presented. It should be noted that the example computing device illustrated in FIG. 1 may also be used in the management server 1600 in FIG. 16. In general, the example computing device illustrated in FIG. 1 and described in detail in the following sections may be used to perform any one or more of the methods or computer based functions disclosed herein. A computing device may be, for example, a server, a computing device that is integrated with other systems or subsystems, a mobile computing device, a cloud-based computing capability, and so forth. The computing device can be any suitable computing device as would be understood in the art, including without limitation, for example, a custom chip, an embedded processing device, a tablet computing device, a personal data assistant (PDA), a desktop, a laptop, a microcomputer, a minicomputer, a server, a mainframe, or any other suitable programmable device. According to one or more embodiments, a single component may be replaced by multiple components and multiple components may be replaced by a single component to perform a given function or functions. Except where such substitution would not be operative, such substitution is within the intended scope of the one or more embodiments.

The computing device implemented as a management server 100 may include a processor 190 that may be any suitable type of processing unit such as, for example, a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources may further include, for example, distributed computing devices, cloud computing resources, and virtual computing resources in general, etc.

The computing device implemented as a management server 100 also may include one or more memories 191 such as, for example, read only memory (ROM), random access memory (RAM), cache memory associated with the processor 190, or other memories such as dynamic RAM (DRAM), static ram (SRAM), programmable ROM (PROM), electrically erasable PROM (EEPROM), flash memory, a removable memory card or disk, a solid state drive, and so forth. The computing device implemented as a management server 100 also may include storage media such as, for example, a storage device that may be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or Blu-ray disk, and so forth. Storage media such as flash drives, solid state hard drives, redundant array of individual disks (RAID), virtual drives, networked drives and other memory means including storage media on the processor 190, or memories 191 are also contemplated as storage devices. It can be appreciated that such memory may be internal or external with respect to operation of the disclosed embodiments. It can be appreciated that certain portions of the processes described herein may be performed using instructions stored on a non-transitory computer-readable medium or media that direct a computer system to perform the process steps. Non-transitory computer-readable media, as used herein, comprises all computer-readable media except for transitory, propagating signals.

Network and communication interfaces 195 and 196, may be separate interfaces or may be a single interface, and may be configured to transmit to, or receive data from, other computing devices across a network 199. The network and communication interfaces 195 and 196 may be, for example, an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 195 and 196 may include, for example, wired data transmission links such as Ethernet and TCP/IP. The communication interfaces 195 and 196 may include, for example, wireless protocols for interfacing with private or public networks 199. For example, the network and communication interfaces 195 and 196 and protocols may include interfaces for communicating with private wireless networks such as, for example, a Wi-Fi network, one of the IEEE 802.11x family of networks, or another suitable wireless network. The network and communication interfaces 195 and 196 may include interfaces and protocols for communicating with public wireless networks 195 and 196, using, for example, wireless protocols used by cellular network providers, including Code Division Multiple Access (CDMA) and Global System for Mobile Communications (GSM), etc. A computing device implemented as a management server 100 may use network and communication interfaces 195 and 196 to communicate with hardware modules such as, for example, a database or data store, or one or more servers or other networked computing resources. Data may be encrypted or protected from unauthorized access.

According to one or more embodiments, the computing device implemented as a management server 100 may include a system bus 193 for interconnecting the various components of the computing device implemented as a management server 100, or the computing device implemented as a management server 100 may be integrated into one or more chips such as, for example, a programmable logic device or an application specific integrated circuit (ASIC), etc. The system bus 193 may include, for example, a memory controller, a local bus, or a peripheral bus for supporting input and output devices 192, and communication interfaces 195 and 196, etc. Example input and output devices 192 may include keyboards, keypads, gesture or graphical input devices, motion input devices, touchscreen interfaces, one or more displays, audio units, voice recognition units, vibratory devices, computer mice, and any other suitable user interface.

The processor 190 and memory 191 may include non-volatile memory for storing, for example, computer-readable instructions, data, data structures, program modules, code, microcode, and other software components for storing the computer-readable instructions in non-transitory computer-readable mediums in connection with the other hardware components for carrying out the methodologies described herein. Software components may include, for example, source code, compiled code, interpreted code, executable code, static code, dynamic code, encrypted code, or any other suitable type of code or computer instructions implemented using any suitable methodology including, for example, high-level, low-level, object-oriented, visual, compiled, or interpreted programming language, etc.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems may be made and used. A number of modifications, including substitutions of systems between or among examples and variations among combinations may be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., may be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically may be grouped together to perform a function or group of related functions. Like reference numerals are generally intended to refer to the same or similar components. Components and modules may be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein may be applied to, or easily modified for use with, other types of equipment, may use other arrangements of computing systems such as client-server distributed systems, and may use other protocols, or operate at other layers in communication protocol stacks, than are described.

It is intended that the specification and examples be considered as exemplary only, with a true scope and spirit of the disclosure being indicated by the following claims.

What is claimed is:

1. A method for monitoring and managing heterogeneous vendor storage systems, the method comprising:
    performing, by a processor of a management system, operations including:
        sending instructions to a vendor storage system among the heterogeneous vendor storage systems to cause the vendor storage system to automatically generate a vendor answer file on the vendor storage system, wherein the vendor answer file includes vendor data defining vendor-format attributes including one or more of allocated space, used space, free space, or non-allocated space for one or more storage devices of the vendor storage system, wherein the sending instructions to the vendor storage system includes:
        sending first instructions to a first vendor storage system among the heterogeneous vendor storage systems to cause the first vendor storage system to retrieve first vendor-format attributes including data of usage and performance of the first vendor storage system, transform the retrieved first vendor-format attributes to a first standard-format data, and automatically generate a first vendor answer file based on the first standard-format data,
        wherein the first vendor answer file includes the data of usage and performance of the first vendor storage system, and the data of usage and performance of the first vendor storage system includes one or more of allocated space, used space, free space, or non-allocated space of the first storage system, and
        sending second instructions, different from the first instructions, to a second vendor storage system among the heterogeneous vendor storage systems to cause the second vendor storage system to retrieve second vendor-format attributes including data of usage and performance of the second vendor storage system, transform the retrieved second vendor-format attributes to a second standard-format data, and automatically generate a second vendor answer file based on the second standard-format data,
        wherein the second vendor answer file includes the data of usage and performance of the second vendor storage system, and the data of usage and performance of the second vendor storage system includes one or more of allocated space, used space, free space, or non-allocated space of the second storage system;
        sending instructions to the vendor storage system to automatically copy the vendor data from the generated vendor answer file to memory of the management system;
        tracking and logging events associated with the copying of the vendor data;
        validating the copied vendor data based on the logged events;
        determining standardized reporting data from the validated vendor data in the memory of the management system;
        saving the standardized reporting data in a data structure formatted for the heterogeneous vendor storage systems;
        receiving a user query regarding the saved standardized reporting data; and
        displaying the saved standardized reporting data in a user interface.

2. The method of claim 1, wherein the first vendor answer file contains different header information from the second vendor answer file.

3. The method of claim 2, wherein the determining the standardized reporting data from the validated vendor data in the memory of the management system includes:
    determining first standardized reporting data from first validated vendor data from the first vendor answer file, and
    determining second standardized reporting data from second validated vendor data from the second vendor answer file,
    wherein standardized header information of the first standardized reporting data matches standardized header information of the second standardized reporting data.

4. The method of claim 3, wherein the standardized header information includes one or more of: total storage space, free storage space, or used storage space.

5. The method of claim 1, wherein the operations further include:
    generating an alert based on the tracking and logging events.

6. The method of claim 5, wherein the alert is generated on a ticketing tool separate from the management system.

7. The method of claim 6, wherein the operations further include:
    performing automated self-healing to address the alert, and
    providing a signal to the ticketing tool for review.

8. The method of claim 1, wherein the operations further include:
    applying an automated configuration change to the vendor storage system from the user interface.

9. The method of claim 1, wherein the operations further include:
    scheduling automatic reports.

10. A management system for monitoring and managing heterogeneous vendor storage systems, the management system comprising:
    a memory to store instructions; and
    a processor to execute the stored instructions enabling:
        a data collector to:
            send instructions to a vendor storage system among the heterogeneous vendor storage systems to cause the vendor storage system to automatically generate a vendor answer file on the vendor storage system, wherein the vendor answer file includes vendor data defining vendor-format attributes including one or more of allocated space, used space, free space, or non-allocated space for one or more storage devices of the vendor storage system, wherein the data collector is further configured to send instructions to the vendor storage system by:

sending first instructions to a first vendor storage system among the heterogeneous vendor storage systems to cause the first vendor storage system to retrieve first vendor-format attributes including data of usage and performance of the first vendor storage system, transform the retrieved first vendor-format attributes to a first standard-format data, and automatically generate a first vendor answer file based on the first standard-format data, wherein the first vendor answer file includes the data of usage and performance of the first vendor storage system, and the data of usage and performance of the first vendor storage system includes one or more of allocated space, used space, free space, or non-allocated space of the first storage system, and sending second instructions, different from the first instructions, to a second vendor storage system among the heterogeneous vendor storage systems to cause the second vendor storage system to retrieve second vendor-format attributes including data of usage and performance of the second vendor storage system, transform the retrieved second vendor-format attributes to a second standard-format data, and automatically generate a second vendor answer file based on the second standard-format data, wherein the second vendor answer file includes the data of usage and performance of the second vendor storage system, and the data of usage and performance of the second vendor storage system includes one or more of allocated space, used space, free space, or non-allocated space of the second storage system, send instructions to the vendor storage system to automatically copy the vendor data from the generated vendor answer file to volatile memory of the management system, and track and log events associated with the copying of the vendor data;

a business logic data converter to:

validate the copied vendor data based on the logged events, determine standardized reporting data from the validated vendor data in the volatile memory of the management system, and save the standardized reporting data in a data structure formatted for the heterogeneous vendor storage systems; and a user interface to:

receive a user query regarding the saved standardized reporting data; and display the saved standardized reporting data.

11. The management system of claim 10, wherein the first vendor answer file contains different header information from the second vendor answer file.

12. The management system of claim 11, wherein the business logic data converter is further configured to determine the standardized reporting data from the validated vendor data in the volatile memory of the management system by:

determining first standardized reporting data from first validated vendor data from the first vendor answer file, and determining second standardized reporting data from second validated vendor data from the second vendor answer file, wherein standardized header information of the first standardized reporting data matches standardized header information of the second standardized reporting data.

13. The management system of claim 12, wherein the standardized header information includes total storage space, free storage space, and used storage space.

14. The management system of claim 10, wherein the processor is further configured to:

generate an alert based on the tracking and logging events.

15. The management system of claim 14, wherein the processor is further configured to generate the alert on a ticketing tool separate from the management system.

16. The management system of claim 15, wherein the processor is further configured to:

perform automated self-healing to address the alert, and provide a signal to the ticketing tool for review.

17. The management system of claim 10, wherein the processor is further configured to:

apply an automated configuration change to the vendor storage system from the user interface.

18. A non-transitory computer readable medium storing instructions that, when executed by a processor of a management system, cause the management system to perform a method for monitoring and managing heterogeneous vendor storage systems, the method comprising:

sending instructions to a vendor storage system among the heterogeneous vendor storage systems to cause the vendor storage system to automatically generate a vendor answer file on the vendor storage system, wherein the vendor answer file includes vendor data defining vendor-format attributes including one or more of allocated space, used space, free space, or non-allocated space for one or more storage devices of the vendor storage system, wherein the sending instructions to the vendor storage system includes:

sending first instructions to a first vendor storage system among the heterogeneous vendor storage systems to cause the first vendor storage system to retrieve first vendor-format attributes including data of usage and performance of the first vendor storage system, transform the retrieved first vendor-format attributes to a first standard-format data, and automatically generate a first vendor answer file based on the first standard-format data, wherein the first vendor answer file includes the data of usage and performance of the first vendor storage system, and the data of usage and performance of the first vendor storage system includes one or more of allocated space, used space, free space, or non-allocated space of the first storage system, and sending second instructions, different from the first instructions, to a second vendor storage system among the heterogeneous vendor storage systems to cause the second vendor storage system to retrieve second vendor-format attributes including data of usage and performance of the second vendor storage system, transform the retrieved second vendor-format attributes to a second standard-format data, and automatically generate a second vendor answer file based on the second standard-format data, wherein the second vendor answer file includes the data of usage and performance of the second vendor storage system, and the data of usage and performance of the second vendor storage system includes one or more of allocated space, used space, free space, or non-allocated space of the second storage system;

sending instructions to the vendor storage system to automatically copy the vendor data from the generated vendor answer file to volatile memory of the management system;

tracking and logging events associated with the copying of the vendor data;

validating the copied vendor data based on the logged events;

determining standardized reporting data from the validated vendor data in the volatile memory of the management system;

saving the standardized reporting data in a data structure formatted for the heterogeneous vendor storage systems;

receiving a user query regarding the saved standardized reporting data; and displaying the saved standardized reporting data in a user interface.

* * * * *